Dec. 30, 1924.

P. MacGAHAN ET AL 1,521,032

ELECTRICAL MEASURING INSTRUMENT

Filed Oct. 2, 1919

WITNESSES:
J.B.Merrill
J.H.Procter

INVENTOR
Paul MacGahan &
Harry P. Sparkes
BY
Charles G. Barr
ATTORNEY

Patented Dec. 30, 1924.

1,521,032

UNITED STATES PATENT OFFICE.

PAUL MacGAHAN, OF PITTSBURGH, AND HARRY P. SPARKES, OF EDGEWOOD PARK, PENNSYLVANIA, ASSIGNORS TO WESTINGHOUSE ELECTRIC & MANUFACTURING COMPANY, A CORPORATION OF PENNSYLVANIA.

ELECTRICAL MEASURING INSTRUMENT.

Application filed October 2, 1919. Serial No. 328,055.

*To all whom it may concern:*

Be it known that we, PAUL MacGAHAN, a citizen of the United States, and a resident of Pittsburgh, in the county of Allegheny and State of Pennsylvania, and HARRY P. SPARKES, a citizen of the United States, and a resident of Edgewood Park, in the county of Allegheny and State of Pennsylvania, have invented a new and useful Improvement in Electrical Measuring Instruments, of which the following is a specification.

Our invention relates to electrical measuring instruments and particularly to direct-current instruments of the moving-vane type.

One object of our invention is to provide a measuring instrument, of the above indicated character, the accuracy of which shall be unaffected by the passage of a surge of current therethrough.

Another object of our invention is to provide an instrument, of the above indicated character, that shall have its actuating winding so disposed with respect to its permanent magnet that the permanence of the magnet shall be unaffected by the current traversing the winding.

In instruments of this character heretofore constructed, the actuating winding was usually disposed between the arms of the permanent magnet, and thus, when the winding was traversed by a relatively large value of current, the magnet was so influenced thereby as to become de-magnetized in such manner as to affect the indications of an instrument.

In view of the above, we provide a permanent magnet of substantially C-shape having an armature between the poles thereof and an actuating electromagnet, the axis of which is parallel to the plane of the permanent magnet and disposed at one side thereof in such position as to actuate the armature, but not to influence the permanence of the permanent magnet. With this arrangement, when a heavy rush of current traverses the actuating electromagnet, the permanent magnet will not become de-magnetized, and thus, the indications of the instrument will be correct, under all conditions of operation.

Figure 1:
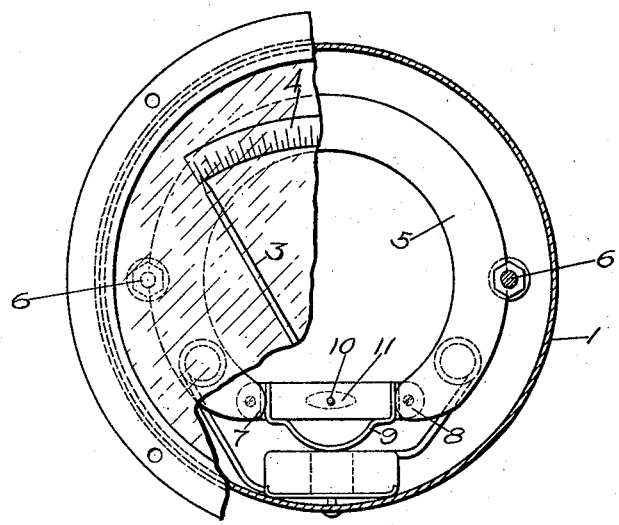
Figure 2:
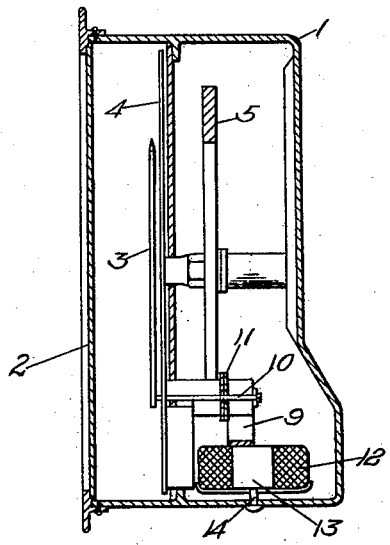

Figure 1 of the accompanying drawings is a front view, partially in section and partially in elevation, of a measuring instrument embodying my invention, and Fig. 2 is a side view, partially in section and partially in elevation, of the instrument shown in Fig. 1.

The instrument comprising our invention comprises, in general, a casing 1, of cylindrical shape, having a window or transparent closure 2 in one end thereof, through which a pointer 3 and a scale 4 are visible. A permanent magnet 5, of substantially C-shape, is supported by lugs 6 on the base of the casing 1, and between the poles 7 and 8 thereof is disposed a member 9, upon which is mounted a shaft 10, having a magnetizable armature 11 and the pointer 3 mounted thereon. The structure 9 is provided for accurately centering the armature 11 in order that the same may be maintained in its initial position by the permanent magnet 5. An actuating winding 12 is disposed around a core member 13 that is secured, by a pin 14, to the casing 1 and is so disposed, with respect to the supporting member 9, that it shall deflect the armature 11 in accordance with the current traversing the same.

The winding 12 is so disposed that the axis of the same is in a plane parallel to the plane of the permanent magnet 5, and is so located below the same, that, when the winding 12 is traversed by an excessive rush of current, it will not de-magnetize the magnet 5 and thus the controlling power of the magnet 5, with respect to the armature 11, will be constant, under all conditions. In other words, the magnet 5 is out of the magnetic influence of the winding 12 and, thus, will not be de-magnetized, irrespective of the value of current traversing the winding 12.

Our invention is not limited to the particular arrangement of the magnets, as various arrangements may be effected, without departing from the spirit and scope of the invention, as set forth in the appended claims.

We claim as our invention:

1. A measuring instrument comprising a permanent magnet and an electromagnet having the magnetic axes thereof disposed in spaced substantially parallel planes, said magnets being spaced from each other in a direction parallel to said planes and having adjacent poles, and a movable magnetizable member disposed adjacent to the poles of both magnets and having its magnetic axis intermediate said planes.

2. A measuring instrument comprising means for effecting flux fields having non-intersecting axes and a movable magnetizable member inductively influenced by said means and having its magnetic axis disposed intermediate said axes.

3. A measuring instrument comprising magnetizable members having non-intersecting magnetic axes and a movable magnetizable member inductively influenced by said members and having its magnetic axis disposed intermediate said axes.

4. A measuring instrument comprising a permanent magnet and an electromagnet having non-intersecting magnetic axes and a movable magnetizable vane inductively influenced by said magnets and having its magnetic axis disposed intermediate said axes.

5. A measuring instrument comprising a permanent magnet, a movable magnetizable vane and an electromagnet having magnetic axes disposed in successively offset parallel planes in the order named.

6. A measuring instrument comprising a permanent magnet, a movable magnetizable vane and an electromagnet disposed in successively offset parallel planes in the order named.

7. A measuring instrument comprising a permanent magnet of substantially C-shape a magnetizable vane disposed in an adjacent offset parallel plane laterally opposite the space between the poles thereof and having a pivot axis normal to said planes and an electromagnet having its magnetic axis in a further offset parallel plane.

In testimony whereof, we have hereunto subscribed our names this 29th day of Sept., 1919.

PAUL MacGAHAN.
HARRY P. SPARKES.